United States Patent Office 2,734,596
Patented Feb. 14, 1956

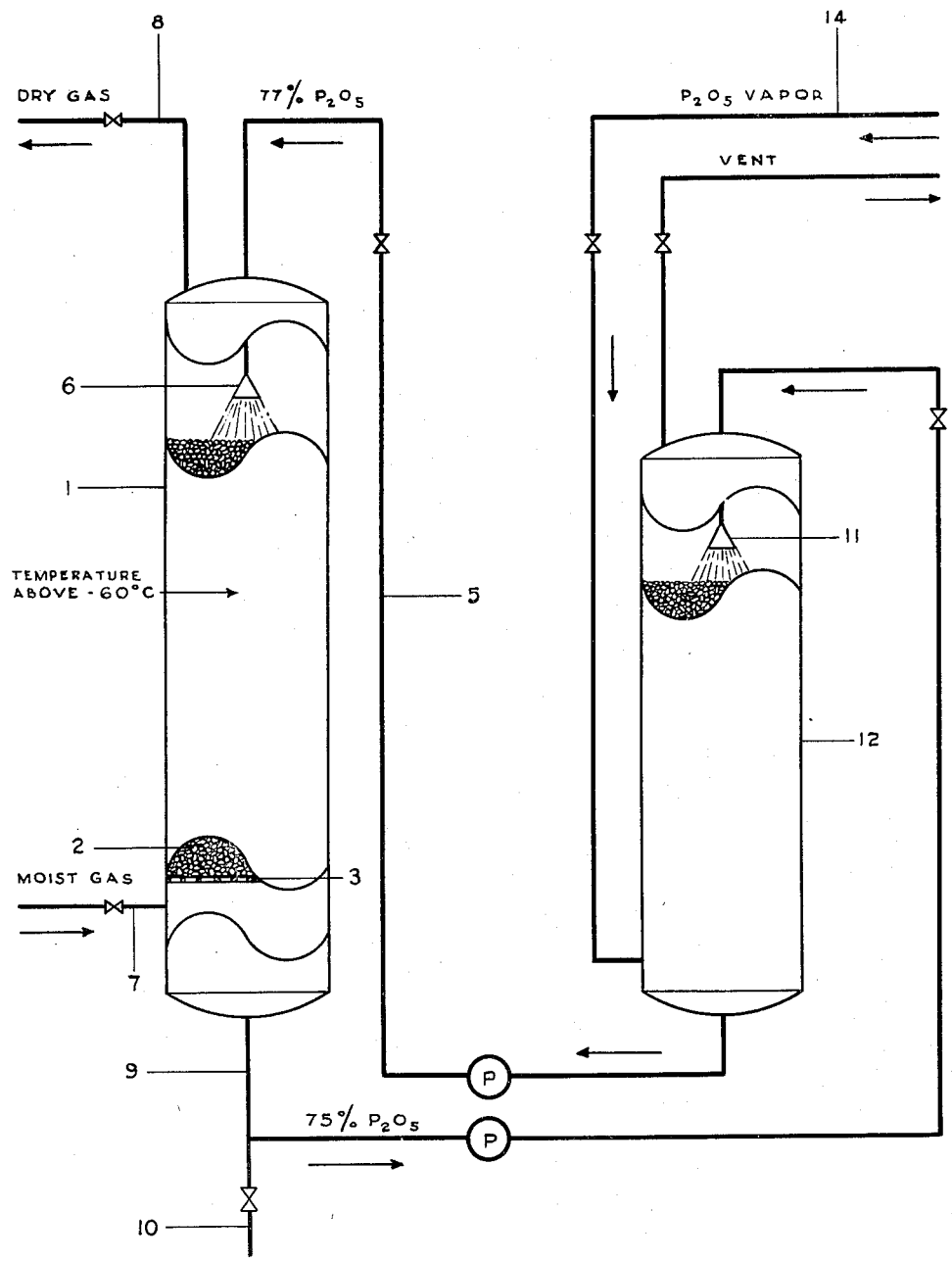

2,734,596

DRYING GASES

Marcus M. Striplin, Jr., Florence, Ala., assignor to the Tennessee Valley Authority, a corporation of the United States Application September 4, 1951, Serial No. 245,066

3 Claims. (Cl. 183—115)

(Granted under Title 35, U. S. Code (1952), sec. 266)

The invention herein described may be manufactured and used by or for the Government for governmental purposes without payment to me of any royalty thereon.

This invention relates to improved processes for drying gases by contact with phosphoric acid.

In many processes it is essential that gases used be thoroughly dried. Among them any processes which have been suggested to this end are a number of proposals to contact gases intimately with phosphorus pentoxide or with phosphoric acid of high strength. French Patent 632,311, published January 7, 1928, is typical of such suggestions.

When attempts are made, however, to apply such suggestions to commercial usage, difficulties due to solidification of the acid used are frequently encountered. In order to keep such acid in liquid state, it has been necessary to apply heat. The application of heat, of course, is expensive, leads to intensification of corrosion problems, and increases the partial vapor pressure of water in equilibrium with the acid. The resulting heating of gases by contact with heated phosphoric acid also is undesirable in many applications, especially when the gas dried is to be prepared for use in the combustion of phosphorus to form phosphorus pentoxide vapors free from hydrated phosphorus pentoxide. Cooling of the combustion chamber is frequently a problem in such processes, and heating of the air in drying the same intensifies the problem.

It is an object of this invention to provide a method for substantially completely drying gases by contact with phosphoric acid, which is operable at low temperatures. Another object is to provide such method in which difficulties due to solidification of the phosphoric acid used are eliminated. Another object is to provide a highly efficient phosphoric acid desiccant which is free-flowing at low temperatures. Other objects and advantages will become apparent as this disclosure proceeds.

I have found that these objects may be attained by providing a desiccant consisting of a phosphoric acid having a concentration in the range corresponding to 75 to 77 weight per cent $P_2O_5$. I have found that phosphoric acid having this concentration remains completely fluid at temperatures above $-60°$ C. The process thus can be carried out by maintaining a liquid phosphoric acid within the range of concentration corresponding to 75 to 77 weight per cent $P_2O_5$ and intimately contacting said gas with such phosphoric acid at a normal outdoor temperature.

The accompanying drawing illustrates diagrammatically one method for conducting a process embodying principles of my invention.

In the drawing the reference numeral 1 indicates a drying tower which may preferably be filled with any suitable type of packing 2, such as Raschig rings, supported upon the suitable supports 3. A phosphoric acid having a concentration corresponding to about 77 weight per cent $P_2O_5$ is introduced at a normal outdoor temperature, i. e., above $-60°$ C., into tower 1 via line 5 and distributor 6. The acid then flows downward by gravity over the packing in the tower. A stream of moist gas is introduced into a lower part of the tower via line 7 and passes upward in countercurrent to the descending phosphoric acid at a temperature above $-60°$ C. Intimate contact of phosphoric acid and gas passing upward through the tower results in a substantially completely dried gas which is withdrawn from the tower via line 8 to use or storage as desired.

The quantities of acid and gas introduced are controlled so that acid accumulating in the bottom of tower 1 has a concentration of about 75 weight per cent $P_2O_5$. This acid is withdrawn via line 9 and is introduced through a suitable distributor 11 into an upper part of a second packed tower 12. Phosphorus pentoxide vapor, preferably substantially free from hydrated phosphorus pentoxide, is introduced from any suitable source (not shown) via line 14 into a lower part of tower 12, where it passes upward in countercurrent to descending phosphoric acid. The quantities of $P_2O_5$ vapor and phosphoric acid to be strengthened are so controlled that a phosphoric acid having a strength corresponding to about 77 weight per cent $P_2O_5$ accumulates in the bottom of tower 12, from which it is withdrawn via line 5 and introduced into the upper part of tower 1.

Alternatively, the acid may be withdrawn via line 10 and be conducted to suitable mixing equipment and there mixed with sufficient acid having a $P_2O_5$ content higher than 77 weight per cent to yield acid having a $P_2O_5$ content of about 77 per cent, or it may be conducted to suitable evaporating equipment and there concentrated by evaporation to a $P_2O_5$ content of about 77 per cent. If desired, the acid withdrawn via line 10 may be conducted to storage or other use as desired and replaced entirely by fresh acid having a concentration of about 77 per cent $P_2O_5$. The preparation of acid having high $P_2O_5$ content is described in U. S. Patent 2,247,373.

I have found that phosphoric acid having a concentration equivalent to 75 to 77 weight per cent $P_2O_5$ has properties believed to be hitherto unknown which make it particularly suitable for the removal of moisture from air or other nonreactive gases. One of these properties is that acids within this range of concentration can be subjected to temperatures as low as $-60°$ C. without formation of crystals in the acid. Such acids are also free-flowing.

On the other hand, crystals are formed at temperatures as high as 35° C. in acids below this range. At concentrations above 77 weight per cent $P_2O_5$, acids are either crystalline or so viscous as not to be free-flowing and are therefore unusable in such gas-drying processes. Corrosion of pumps, piping, and equipment by phosphoric acid of more than 72.44 per cent $P_2O_5$ content is very low at room temperatures. However, as the temperature of the acid is increased, the rate of corrosive attack increases markedly. Since phosphoric acid of concentrations in the range from 75 to 77 weight per cent $P_2O_5$ flows freely and can be pumped at ordinary outdoor temperatures, corrosion can be held to the minimum by using the 75–77 per cent $P_2O_5$ acid at these temperatures while drying air or other gases rather than using a phosphoric acid containing less than 75 per cent $P_2O_5$ or more than 77 per cent $P_2O_5$, because much higher temperatures are required to permit such acids to be pumped.

In addition, acids having a $P_2O_5$ content of from 75 to 77 per cent produce the maximum drying effect on gases obtainable with phosphoric acid. If phosphoric acids having $P_2O_5$ contents below 75 per cent or above 77 per cent are utilized in such processes, it is necessary to heat them to operable fluidity. This heating is not only expensive in itself, but also so increases the partial vapor pressure of water in equilibrium with such acids that the drying effect of higher-strength acids is below that of acids having $P_2O_5$ contents in the range from 75 to 77 per cent.

*Example*

Two samples of phosphoric acid having concentrations equivalent to 75–77 weight per cent $P_2O_5$ were prepared and their behavior at ordinary outdoor temperatures was compared with other samples of phosphoric acid having concentrations equivalent respectively to 73.8, 74.3, and 77.3 weight per cent $P_2O_5$. All samples were seeded with crystalline orthophosphoric acid and were stored in a box cooled with solid carbon dioxide. During this period of storage, additional crystal nuclei formed in samples 73.8 and 74.3, while no additional crystals were formed in those acids having concentrations in the range of 75–77 per cent $P_2O_5$. The samples having concentrations at 73.8 and 74.3 per cent were slowly warmed and their appearance was as follows:

| Temp., °C. | Appearance of sample | |
|---|---|---|
| | 73.8 | 74.3 |
| 21.0 | ⅔–¾ crystalline | Essentially all crystalline. |
| 25.4 | Essentially all crystalline | Some crystals dissolved. |
| 29.0 | ----do---- | Most of the crystals dissolved. |
| 33.5 | ----do---- | All liquid. |
| 38.2 | Most of the crystals dissolved | |
| 41.0 | All liquid | |

Samples having concentrations in the range from 75 to 77 weight per cent $P_2O_5$ were kept at 0° to 20° C. for two days. No crystals formed during this time, and at the end of the period there was present only the original crystals of orthophosphate acid used for seeding the samples. The sample containing 77.3 per cent $P_2O_5$ became essentially entirely crystalline under the same conditions.

In an effort to cause crystallization in samples having $P_2O_5$ content in the range from 75 to 77 per cent, the samples were subjected to the following treatments:

1. The samples were seeded with crystals of orthophosphoric acid.
2. A piece of freshly cut iron wire was placed in each sample.
3. The samples were kept in ice water for about two hours, then cooled to below −60° C. in a solid carbon dioxide-acetone mixture. The samples were stirred intermittently.
4. Fresh samples were seeded with pyrophosphoric acid crystals and stored at 0° C. for extended lengths of time.

None of these treatments caused the formation of crystals in the samples. Even at the lowest temperatures attained in these tests the acid was free-flowing.

I claim as my invention:

1. A process for drying a gas which comprises maintaining a liquid phosphoric acid within the range of concentration corresponding to 75 to 77 weight per cent $P_2O_5$; and intimately contacting said gas with such phosphoric acid at a temperature above −60° C. and below 254° C.

2. A process for drying a gas which comprises continuously passing a stream of a liquid phosphoric acid having a concentration corresponding to about 77 weight per cent $P_2O_5$ into an upper part of, and downward through, a tower at a temperature above −60° C. and below 254° C.; continuously passing a stream of moist gas into a lower part of, and upward through, the tower in intimate contact with such descending phosphoric acid; continuously withdrawing a stream of dry gas from an upper part of the tower; and withdrawing phosphoric acid having a concentration corresponding to about 75 weight per cent $P_2O_5$ from a lower part of the tower.

3. A process for drying a gas which comprises continuously passing a stream of a liquid phosphoric acid having a concentration corresponding to about 77 weight per cent $P_2O_5$ into an upper part of, and downward through, a tower at a temperature above −60° C. and below 254° C.; continuously passing a stream of moist gas into a lower part of, and upward through, the tower in intimate contact with such descending phosphoric acid; continuously withdrawing a stream of dry gas from an upper part of the tower; withdrawing phosphoric acid having a concentration corresponding to about 75 weight per cent $P_2O_5$ from a lower part of the tower; increasing the concentration of such withdrawn acid to that corresponding to about 77 weight per cent $P_2O_5$; and recycling the resulting acid to an upper part of the tower.

References Cited in the file of this patent

UNITED STATES PATENTS

| | | |
|---|---|---|
| 1,812,548 | Obermiller | June 30, 1931 |
| 2,162,158 | Coey | June 13, 1939 |
| 2,169,588 | Malowan | Aug. 15, 1939 |
| 2,247,373 | Hartford et al. | July 1, 1941 |
| 2,272,402 | Du Bois | Feb. 10, 1942 |